United States Patent
Stoodley

(10) Patent No.: US 6,813,764 B2
(45) Date of Patent: Nov. 2, 2004

(54) COMPILER GENERATION OF INSTRUCTION SEQUENCES FOR UNRESOLVED STORAGE REFERENCES

(75) Inventor: Kevin A. Stoodley, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 590 days.

(21) Appl. No.: 09/870,206

(22) Filed: May 29, 2001

(65) Prior Publication Data

US 2002/0166113 A1 Nov. 7, 2002

(30) Foreign Application Priority Data

May 7, 2001 (CA) .............................................. 2346762

(51) Int. Cl.[7] ................................................. G08F 9/45
(52) U.S. Cl. ........................ 717/153; 717/148; 717/118
(58) Field of Search ................................ 717/153, 148, 717/118; 712/216, 225; 718/102, 107; 719/315; 711/100; 713/1

(56) References Cited

U.S. PATENT DOCUMENTS

| | | | |
|---|---|---|---|
| 5,408,665 A | 4/1995 | Fitzgerald | 717/163 |
| 5,485,619 A | 1/1996 | Lai et al. | 717/150 |
| 5,734,822 A | 3/1998 | Houha et al. | 717/167 |
| 5,774,685 A | 6/1998 | Dubey | 712/205 |
| 5,790,822 A | 8/1998 | Sheaffer et al. | 712/204 |
| RE36,204 E | 4/1999 | Gosling | 717/139 |
| 5,940,626 A | 8/1999 | Sollars | 712/41 |
| 5,974,256 A | 10/1999 | Matthews et al. | 717/141 |
| 6,026,485 A * | 2/2000 | O'Connor et al. | 712/226 |
| 6,078,744 A * | 6/2000 | Wolczko et al. | 717/153 |
| 6,081,665 A * | 6/2000 | Nilsen et al. | 717/116 |
| 6,093,216 A * | 7/2000 | Adl-Tabatabai et al. | 717/128 |
| 6,118,940 A * | 9/2000 | Alexander et al. | 717/127 |
| 6,148,391 A * | 11/2000 | Petrick | 712/202 |
| 6,151,703 A * | 11/2000 | Crelier | 717/136 |
| 6,256,784 B1 * | 7/2001 | Grove | 717/139 |
| 6,272,674 B1 * | 8/2001 | Holiday, Jr. | 717/174 |
| 6,324,686 B1 * | 11/2001 | Komatsu et al. | 717/148 |
| 6,353,881 B1 * | 3/2002 | Chaudhry et al. | 712/228 |
| 6,366,876 B1 * | 4/2002 | Looney | 703/25 |

(List continued on next page.)

OTHER PUBLICATIONS

Exploiting JAVA Instruction/ Thread Level Parallelism with Horizontal Multithreading, Kenji Wantanbe et al, IEEE, 2001 pp. 122–129.*

(List continued on next page.)

Primary Examiner—Todd Ingberg
(74) Attorney, Agent, or Firm—John L. Rogitz

(57) ABSTRACT

A compiler component for the generation of an optimal instruction sequence, the sequence including a compile-time unresolved reference to be resolved at runtime. The compiler generating a snippet list with entries corresponding to snippets defined for instructions including unresolved compile-time references. A runtime helper routine being defined for resolving references at runtime. For each instruction with an unresolved reference, generating a snippet including data for identifying the reference and for permitting resolution of the reference at runtime by the runtime helper routine. The snippet also including a copy of the instruction containing the unresolved reference. The location in the compiled code for the unresolved instruction being written with a call instruction to the snippet. The runtime helper being invoked by the snippet at runtime to resolve the references and to copy the unresolved code copy to the compiled code, with the references resolved.

15 Claims, 1 Drawing Sheet

U.S. PATENT DOCUMENTS

| | | | |
|---|---|---|---|
| 6,385,764 B1 * | 5/2002 | Blandy et al. | 717/127 |
| 6,430,649 B1 * | 8/2002 | Chaudhry et al. | 711/100 |
| 6,453,463 B1 * | 9/2002 | Chaudhry et al. | 717/127 |
| 6,463,582 B1 * | 10/2002 | Lethin et al. | 717/158 |
| 6,684,398 B2 * | 1/2004 | Chaudhry et al. | 718/106 |
| 6,704,927 B1 * | 3/2004 | Bak et al. | 717/151 |
| 6,718,457 B2 * | 4/2004 | Tremblay et al. | 712/212 |
| 6,721,944 B2 * | 4/2004 | Chaudhry et al. | 717/154 |
| 6,738,967 B1 * | 5/2004 | Radigan | 717/146 |

OTHER PUBLICATIONS

SOOT–a JAVA Bytecode Optimization Framework, Raja Vallee–Rai et al, pp. 1–11, ACM 1997.*

Briki:an optimizing JAVA Compiler, Cierniak et al, pp. 179–184, Feb. 1997.*

Performance Measurement of Dynamically Complied JAVA Executions, Tia Newhall et al, ACM, 1999, pp. 42–50.*

* cited by examiner

COMPILER GENERATION OF INSTRUCTION SEQUENCES FOR UNRESOLVED STORAGE REFERENCES

FIELD OF THE INVENTION

The present invention is directed to an improvement in computing systems and in particular to an improvement in the generation of instruction sequences for unresolved storage references in executable code.

BACKGROUND OF THE INVENTION

Certain computer languages, such as Java, support compilers that generate code that includes unresolved references. These references cannot be determined at compile-time but are able to be resolved at runtime. The inclusion of unresolved references in compiled code introduces potential inefficiencies in the runtime execution of the compiled code. Typically such unresolved references are generated where portions of code are compiled in a language for which the code is otherwise interpreted. The details of how unresolved references may occur in a Java programming environment are set out below.

Java language program code is stored as Java byte-code. Java byte-code is interpreted by a Java virtual machine which implements the Java language on a particular computer. A common way to optimize the interpretation of Java byte-code by a virtual machine is for the virtual machine to incorporate a Java JIT (just in time) compiler. Such a compiler will compile portions of the Java byte-code, typically those that are frequently interpreted by the virtual machine, and generate executable code for the machine corresponding to those portions of the Java byte-code. Such compilation is referred to as dynamic compilation.

When dynamically generating compiled code using a Java JIT compiler, code will typically be compiled which includes unresolved references. For example, a static data reference may be compiled where the address of the static data item is unknown at compile time, but which will be resolved at runtime. With respect to instance data, the offset from the beginning of an object to which an instance has been mapped may be unknown at compile time, but will similarly be resolvable at runtime. Thus for dynamic compilation of Java (and other analogous languages) it is common to have executable code emitted by the compiler that contains references that are only able to be resolved at runtime. This differs from traditional compilers where all references are resolved when the executable code is emitted. The dynamically generated executable code requires executable code to resolve the references at execution time.

One prior art approach to code generation for unresolved runtime references is to insert a runtime test into the compiled code which will determine whether the data reference is resolved at execution of the instruction having the storage reference. Such an approach includes an overhead associated with the runtime check carried out whenever the storage reference is reached in the compiled code.

A second prior art approach is to introduce an indirection into the data reference. The first access of the data is defined by the compiler to result in a trap to a trap handler that will load the proper resolved data reference to the indirect data structure. Further accesses to the storage reference will result in the proper resolved data reference being accessed. This approach, however, includes a runtime cost associated with the indirect access to the data reference. It is therefore desirable to have a compiler for emitting code which may include unresolved references but which will generate code to provide for efficient run-time resolution and execution of the initially unresolved code.

SUMMARY OF THE INVENTION

According to an aspect of the present invention there is provided an improved computer system for the generation of instruction sequences for unresolved storage references in compiled code.

According to another aspect of the present invention there is provided a computer program product including a computer usable medium having computer readable program code means embodied in the medium, the program code means including a compiler and an associated runtime helper, the runtime helper being defined for resolving references at runtime, the compiler including means to emit compiled code including a set of target instructions, each target instruction having an associated target location in the compiled code, each target instruction including an unresolved reference at compile time, the emitted code for each target instruction including a trigger instruction initially located at the associated target location in the compiled code and a snippet including a copy of the target instruction including the unresolved reference and resolution data useable by the runtime helper to resolve references in the target instruction, the compiler further including means for defining the trigger instruction such that on execution the trigger instruction triggers the execution of defined instructions to pass data to the runtime helper for resolution of the unresolved reference in the copy of the target instruction and to replace the trigger instruction at the target location with the copy of the target instruction having the unresolved reference resolved.

According to another aspect of the present invention there is provided the above computer program product in which the compiler further includes means for first emitting, for each one of the set of target instructions, the associated unresolved target instruction at the corresponding target location, means for creating and maintaining a snippet list including entries, each entry in the snippet list corresponding to one of the set of target instructions, means for subsequently traversing the snippet list, and for each entry in the snippet list defining the snippet relating to the one of the set of target instructions corresponding to the snippet list entry, storing the associated unresolved target instruction in the defined snippet to permit the replacement of the associated unresolved target instruction at its target location with the corresponding trigger instruction.

According to another aspect of the present invention there is provided the above computer program product in which the trigger instruction for a one of the set of target instructions is a call to the corresponding snippet and in which the snippet includes instructions to pass the resolution data to the helper code.

According to another aspect of the present invention there is provided the above computer program product in which the trigger instruction for a one of the set of target instructions includes an illegal instruction for throwing an exception on execution, and in which the computer program product further includes computer usable medium having computer readable program code means embodied in the medium including a trap handler including instructions to branch to a snippet corresponding to the target instruction when the exception is thrown.

According to another aspect of the present invention there is provided the above computer program product in which trap handler further includes a data structure for identifying snippets and in which the instructions to branch to a snippet further include a look up in the data structure to define the branch to the snippet corresponding to the target instruction.

According to another aspect of the present invention there is provided the above computer program product in which the compiler is a Java just in time compiler.

According to another aspect of the present invention there is provided a computer program product including a computer usable medium having computer readable program code means embodied in the medium for defining a Java runtime environment, the computer program product including computer readable program code means including a Java just in time compiler and an associated runtime helper, the runtime helper being defined for resolving references at runtime, the compiler including means to emit compiled code including a set of target instructions, each target instruction having an associated target location in the compiled code, each target instruction including an unresolved reference at compile time, the means to emit compiled code including means for first emitting, for each one of the set of target instructions, an associated unresolved target instruction at the corresponding target location, means for creating and maintaining a snippet list including entries, each entry in the snippet list corresponding to one of the set of target instructions, means for subsequently traversing the snippet list to emit compiled code, for each target instruction, including a snippet including instructions and data for calling the helper code to resolve references in the specified target instruction at runtime, and a copy of the target instruction including the unresolved reference, and a call instruction to the snippet, the call instruction being written to the target location in the compiled code, the helper code including instructions to resolve references at runtime and to replace the associated trigger instruction at a specified target location with the copy of the associated target instruction having the unresolved reference resolved.

According to another aspect of the present invention there is provided a method of generating compiled code for an instruction having an unresolved compile-time reference, the method including the following steps:

defining a runtime helper routine for resolving unresolved references at runtime, emitting unresolved code in the compiled code including a default reference value as a placeholder for the unresolved reference, emitting a snippet including instructions and data to identify the unresolved code in the compiled code and to call and provide data to the runtime helper routine to permit the unresolved reference to be resolved, copying the unresolved code to the snippet, replacing the unresolved code in the compiled code with a call instruction for calling the snippet, the runtime helper being defined to resolve references at runtime with respect to the copy of the unresolved code in the snippet to define resolved code to replace the call instruction for calling the snippet with the resolved code.

According to another aspect of the present invention there is provided the above method further including the steps of:

generating a snippet list including entries corresponding to each snippet emitted, traversing the snippet list to carry out the step of replacing unresolved code in the compiled code with the call instruction to the appropriate snippet.

According to another aspect of the present invention there is provided a computer program product including a computer usable medium having computer readable program code means embodied in the medium for carrying out the above methods.

According to another aspect of the present invention there is provided a method for emitting compiled computer code to resolve references in a set of target instructions, each target instruction to be executed at a target location in the compiled code, each target instruction including an unresolved reference at compile time, the method including the steps of emitting a trigger instruction for each target instruction, the trigger instruction being located at the target location in the compiled code and emitting a snippet including a copy of the target instruction including the unresolved reference and resolution data useable by a runtime helper, the trigger instruction being defined such that on execution the trigger instruction triggers the execution of defined instructions to pass the resolution data to the runtime helper for resolution of the unresolved reference in the copy of the target instruction and to replace the trigger instruction at the target location with the copy of the target instruction having the unresolved reference resolved.

According to another aspect of the present invention there is provided the above method further including the steps of first emitting, for each one of the set of target instructions, the associated unresolved target instruction at the corresponding target location, creating and maintaining a snippet list including entries, each entry in the snippet list corresponding to one of the set of target instructions, subsequently traversing the snippet list, and for each entry in the snippet list defining the snippet in the compiled code relating to the one of the set of target instructions corresponding to the snippet list entry, storing the associated unresolved target instruction in the defined snippet to permit the replacement of the associated unresolved target instruction at its target location with a corresponding trigger instruction.

Advantages of the present invention include the generation of an optimal instruction sequence for a storage reference that is unresolved at compile time. The code sequence is generated at runtime the first time that the unresolved storage reference is reached. When the storage reference is subsequently reached, there is no overhead associated with executing the storage reference as the executable code has been modified to include the optimal code for carrying out the storage reference.

DETAILED DESCRIPTION OF THE PREFERRED EMBODIMENT

Figure 1:
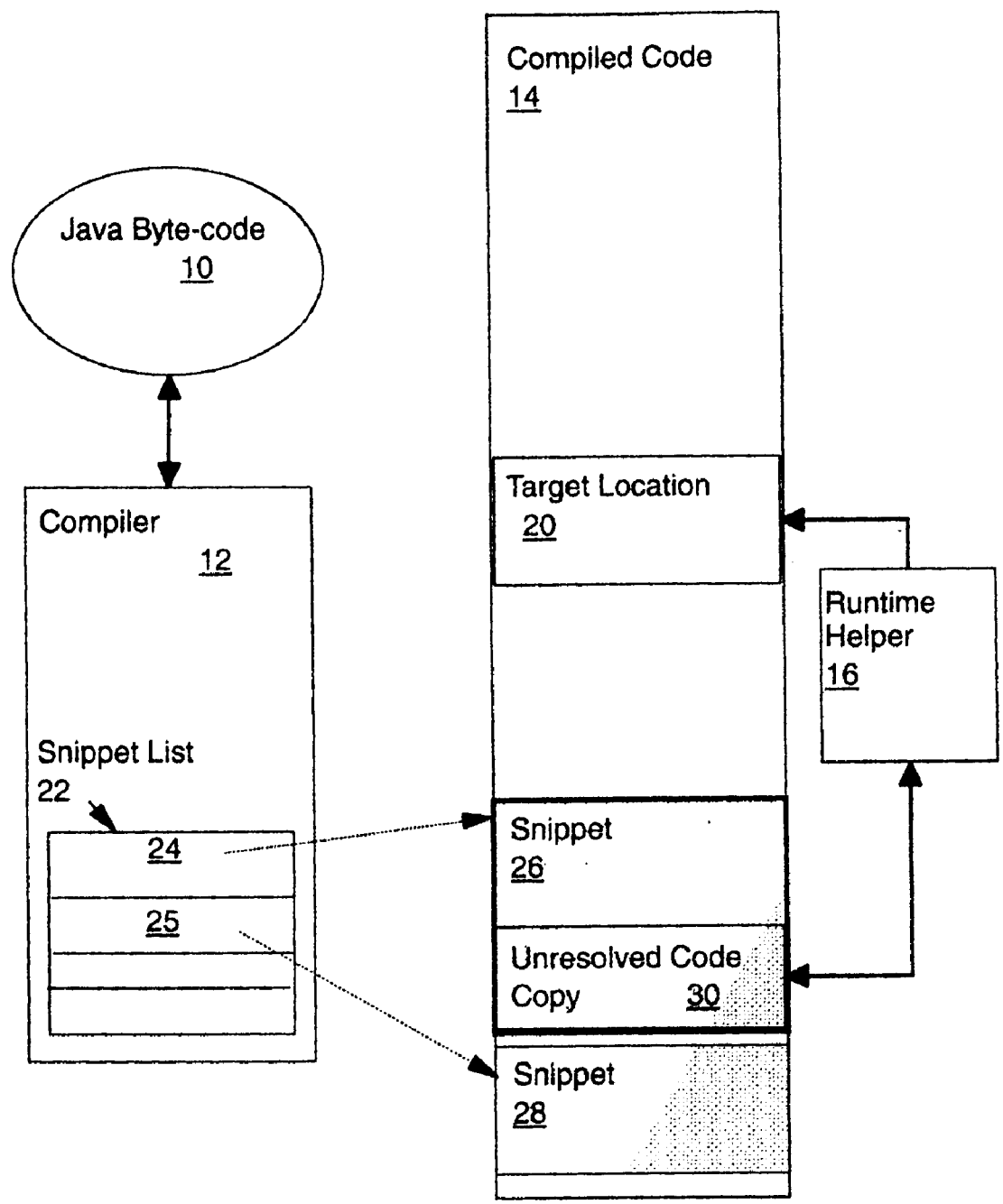
FIG. 1 is a schematic block diagram showing an example of instruction generation in accordance with the preferred embodiment.

FIG. 1 is a schematic block diagram illustrating instruction sequences according to the preferred embodiment. FIG. 1 includes Java byte-code 10, compiler 12, compiled code 14 and runtime helper 16. In FIG. 1, compiled code 14 is compiled by compiler 12 to represent Java byte-code 10.

Runtime helper 16 is code that is able to resolve unresolved storage references, at runtime. Typically, runtime helper 16 is an assembler routine that is written to permit different types of references to be resolved at runtime. In operation, runtime helper 16 is passed data to identify the unresolved reference and to permit the reference to be resolved by instructions in runtime helper 16.

The preferred embodiment is described in the context of a Java just in time compiler. The invention may be implemented for other suitable compilers that generate code with references which are unresolved at compile time.

According to the preferred embodiment, compiler 12 generates compiled code 14, including instruction sequences for compile-time unresolved storage references found in Java byte-code 10. In the example of FIG. 1, target location 20 is initially written with a target instruction containing an unresolved reference. Compiler 12 of the preferred embodiment emits unresolved code to target location 20 which has the form of the final (reference resolved) binary encoding for the instruction being compiled (the target instruction). However, the unresolved code as emitted by compiler 12 for target location 20 has default values representing the references that will be resolved in the target instruction at runtime. An adjustment to the length of the unresolved code at target location 20 may also be made, as is described in more detail below.

At the time that the unresolved code at target location 20 is emitted by compiler 12, an entry is added to snippet list 22 maintained by compiler 12. In the example of FIG. 1, entry 24 corresponds to the unresolved code for the target instruction found at target location 20. The information maintained in entry 24 includes the address of target location 20 within compiled code 14, the length of the binary encoding of the target instruction at target location 20, as well as information used for resolving the unresolved reference or references in the target instruction. In the preferred embodiment, this last item includes data for identifying the unresolved entity referred to in the target instruction. For example, the entity may be an unresolved string, the address of a static data member, the offset from the beginning of an instance of an unresolved instance variable, or the address of an unresolved class object. Snippet list 22 identifies such entities to permit the appropriate runtime resolution to be carried out by runtime helper 16. In the preferred embodiment, data identifying the method in the compiled code which contains the target instruction (i.e. target location 20) is also maintained in snippet list 22. In the preferred embodiment, the identity of the method is specified by the address of the constant pool of the method referring to the unresolved entity and the constant pool index of the unresolved entity in that constant pool.

The example of FIG. 1 shows a second entry 25 in snippet list 22. Entry 25 is generated for another unresolved storage reference (not shown) reached by compiler 12 in compiling Java byte-code 10. In the example illustrated in FIG. 1, entry 25 references snippet 28.

Compiler 12 generates code that can invoke runtime helper 16. Runtime helper 16 is supplied with compiler 12 and is invoked at runtime by compiled code 14 when references require resolution. In general, the resolution of unresolved references by invoking a runtime routine such as runtime helper 16 is known in the art. Runtime helper 16 in the preferred embodiment described includes both code to resolve an identified reference in the target instruction and code that is defined to interact with snippets generated by compiler 12 in the preferred embodiment of the invention, as described in more detail below.

In the preferred embodiment, snippet list 22 is traversed following the compilation of a method containing unresolved storage references. In the example of FIG. 1, compiler 12 traverses snippet list 22 after code is initially emitted for the method of compiled code 14. Alternatively, snippet list 22 may be traversed at other times or the list itself may be omitted. Where there is no snippet list maintained by the compiler, the steps set out below with reference to traversal of the snippet list are carried out at the time that an instruction is first written to target location 20 by compiler 12. In such a case, the unresolved target instruction is not initially written to target location 20. Instead, the trigger instruction (referred to below) is written to target location 20. Where snippet list 22 is maintained and traversed after the executable code for the entire method is generated by compiler 12, the snippet code may be simply appended to the already emitted executable code, as is described below.

As indicated above, in the preferred embodiment, snippet list 22 is traversed after the generation of the binary encoding for the entire method represented by compiled code 14 in FIG. 1. For each entry in snippet list 22, a sequence of instructions is appended to the compiled code for the method in compiled code 14. In the example of FIG. 1, when the traversal of snippet list 22 reaches entry 24, the sequence of instructions referred to as snippet 26 is appended to compiled code 14. The instructions in snippet 26 enable runtime helper 16 to resolve the data references in target location 20 that are unresolvable at compile time. In the preferred embodiment, snippet 26 passes the address of the constant pool and the constant pool index to runtime helper 16.

Compiler 12 also writes a series of bytes following each snippet in compiled code 14. For snippet 26, these bytes are shown as unresolved code copy 30. This byte string following snippet 26 includes a byte representing the length of target location 20 and a byte representing the offset from the beginning of target location 20 to the immediate field within that instruction that was unknown at compile time (the unresolved reference in the target instruction). Following these two bytes, unresolved code copy 30 includes a copy of the binary encoding of the unresolved target instruction. In the preferred embodiment, the copy is made from the machine code found at target location 20.

After emitting unresolved code copy 30, compiler 12 overwrites target location 20 with a trigger instruction. In the preferred embodiment, a trigger instruction is a call instruction to a snippet. Typically, the length of the trigger instruction (such as a call instruction to snippet 26) will be shorter than the target instruction initially written to target location 20. Where this is not the case, compiler 12 adjusts the unresolved target instruction machine code initially emitted to target location 20 by inserting a suitable null op code string to ensure that target location 20 has a length equal to the code for the trigger instruction. The code generation pattern followed by compiler 12, as set out above, is used to generate an optimal instruction sequence for the resolved version of the target instruction as described below.

In the preferred embodiment, when at runtime, the trigger instruction at target location 20 is reached in compiled code 14, the call instruction to snippet 26 is executed. As is explained below, the call to snippet 26 is only executed once. The instructions in snippet 26 pass data and perform a call to runtime helper 16. Runtime helper 16 uses the data passed from snippet 26 to resolve the data reference in the copy of the target instruction found in unresolved code copy 30. Alternatively, where the reference cannot be resolved (there is an error in the data access) runtime helper 16 throws an exception.

In the preferred embodiment, after runtime helper 16 resolves the unresolved reference in code copy 30, it copies that completed (resolved) target instruction into target location 20. Execution is then returned to the now resolved target instruction found at target location 20. The remaining machine code found in compiled code 14 is then executed. As is apparent from the above description, the trigger instruction at target location 20 is overwritten when runtime helper 16 copies the resolved target instruction to target location 20. Snippet 26 is therefore not called on subsequent executions of the instruction located at target location 20, once runtime helper 16 has copied the resolved instruction to target location 20.

When target location 20 is reached in subsequent executions of compiled code 14, the now-modified target instruction is found. As a result, optimal code (the resolved code for the target instruction and only the resolved code) will be executed with no additional overhead. The instruction appears exactly as it would have if the unresolved reference had been resolved at compile time.

In the preferred embodiment, snippet 26 pushes the address of the constant pool and the constant pool index onto the stack prior to a call to runtime helper 16. The return address for the call from target location 20 to snippet 26 and the return address for the call from snippet 26 to runtime helper 16, are also found on the stack. Runtime helper therefore has the data necessary to determine the location of unresolved code copy 30 and target location 20 and the instructions at these locations may therefore be modified by runtime helper 16, based on resolution of the unresolved target instruction reference in the initially defined instruction of target location 20.

Compiler 12 may also emit instructions for the modification of multiple occurrences of unresolved code in compiled code 14. Such multiple occurrences may be dealt with using a single snippet where the different instructions have the same unresolved storage reference, are dominated by a first unresolved storage reference and are each within the same exception handling scope. In such a case, a snippet such as snippet 28, may have associated with it multiple copies of instructions and additional data may be included in the snippet to identify where the instruction copies are to be found in compiled code 14. Further data is also required to be passed to runtime helper 16 to indicate the number of instructions to be modified. Alternatively, the series of unresolved code copies following the snippet may be terminated by a zero byte following.

The preferred embodiment has been described where the trigger instruction at target location 20 is initially a call instruction to snippet 26. An alternative implementation of the preferred embodiment is to define a trap handler such that if the trigger instruction is a pre-determined illegal instruction, the trap handler will branch to a defined snippet or will access snippet data to set up a call to runtime helper 16.

In such an implementation, when execution first reaches target location 20 an exception will be thrown. The trap handler catching the exception will perform a data structure look up of the illegal trigger instruction. The data structure will identify the trigger instruction to permit the trap handler to identify the associated snippet. Execution may be transferred to that snippet. Alternatively, the trap handler may include instructions to access the relevant snippet data based on the snippet location found in the data structure. In this latter case, the trap handler will itself launch runtime helper 16 after passing the relevant snippet data to runtime helper 16. In this alternative implementation the trigger instruction is defined for execution transfer to a routine where snippet data is made accessible for runtime helper 16. Snippet 26 may itself contain instructions to pass this data to runtime helper 16 or alternatively another routine, such as a trap handler, may access snippet data in snippet 26 to pass the required information to runtime helper 16. As the above indicates, different mechanisms may be used to implement the preferred embodiment approach of emitting a target instruction and a snippet that are used to permit runtime helper 16 to replace the trigger instruction at target location 20 with the target instruction (the resolved instruction corresponding to unresolved code copy 30). Although a preferred embodiment of the present invention has been described here in detail, it will be appreciated by those skilled in the art that variations may be made thereto without departing from the spirit of the invention or the scope of the appended claims.

The embodiments of the invention in which an exclusive property or privilege are claimed are defined as follows:

1. A computer program product comprising a computer usable medium tangibly embodying computer readable program code means comprising a compiler and an associated runtime helper, the runtime helper being defined for resolving references at runtime, the compiler comprising means to emit compiled code including a set of target instructions, each target instruction having an associated target location in the emitted compiled code and having an unresolved reference at compile time, the emitted compiled code for each target instruction comprising:

code means for directing the computer to define a trigger instruction initially located at the associated target location in the emitted compiled code;

code means for directing the computer to define a snippet comprising a copy of the target instruction including the unresolved reference and resolution data useable by the runtime helper to resolve unresolved references in the target instruction; and the compiler further comprising code means for directing the computer to_define the trigger instruction to trigger the execution of defined instructions to pass data to the runtime helper for resolution of the unresolved reference in the copy of the target instruction and to replace the trigger instruction at the associated target location with the copy of the target instruction having the unresolved reference resolved.

2. The computer program product of claim 1 in which the compiler further comprises:

code means for directing the computer to first emit, for each one of the set of target instructions, the associated unresolved target instruction at the corresponding target location;

code means for directing the computer to create and maintain a snippet list comprising entries, each entry in the snippet list corresponding to one of the set of target instructions;

code means for directing the computer to subsequently traverse the snippet list, and for each entry in the snippet list defining the snippet relating to the one of the set of target instructions corresponding to the snippet list entry; and code means for directing the computer to store the associated unresolved target instruction in the defined snippet to permit replacing of the associated unresolved target instruction at its associated target location with the corresponding trigger instruction.

3. The computer program product of claim 1 in which the trigger instruction for a one of the set of target instructions is a call to the corresponding snippet and in which the snippet comprises instructions to pass the resolution data to the runtime helper.

4. The computer program product of claim 1 in which the trigger instruction for a one of the set of target instructions comprises an illegal instruction for throwing an exception on execution, and in which the computer program product further comprises program code means comprising code means for directing the computer to define a trap handler comprising instructions to branch to the snippet corresponding to the target instruction when the exception is thrown.

5. The computer program product of claim 4 in which the trap handler further comprises a data structure for identifying snippets and in which the instructions to branch to the snippet corresponding to the target instruction further comprise a look up in the data structure to define the instructions to branch to the snippet corresponding to the target instruction.

6. The computer program product of claim 1 in which the compiler is a Java just in time compiler.

7. A computer program product comprising a computer usable medium tangibly embodying computer readable program code means for defining a Java runtime environment, said computer readable program code means comprising a Java just in time compiler and an associated runtime helper, the runtime helper being defined for resolving references at runtime, the compiler comprising means to emit compiled code including a set of target instructions, each target instruction having an associated target location in the emitted compiled code, each target instruction including one or more unresolved references at compile time, the means to emit the compiled code comprising:

code means for directing the computer to first emit, for each one of the set of target instructions, an associated unresolved target instruction at the corresponding target location;

code means for directing the computer to create and maintain a snippet list comprising entries, each entry in the snippet list corresponding to one of the set of target instructions;

code means for directing the computer to subsequently traverse the snippet list to emit compiled code, for each target instruction, comprising:

a snippet comprising instructions and data for calling the runtime helper to resolve the unresolved references in the target instruction at runtime, and comprising a copy of the target instruction including the unresolved references, and a call instruction to the snippet, the call instruction being written to the target location in the emitted compiled code, the runtime helper comprising instructions for a specified target instruction to resolve the unresolved references of the specified target instruction at runtime and for the specified target instruction, to replace the associated trigger instruction at a specified target location with the copy of the specified target instruction having the unresolved reference resolved.

8. A method of generating compiled code for an instruction having an unresolved compile-time reference, comprising the acts of:

specifying a runtime helper routine for resolving unresolved references at runtime;

emitting unresolved code in the generated compiled code comprising a default reference value being a placeholder for an unresolved reference;

emitting a snippet comprising instructions and data to identify the unresolved emitted code in the compiled code and to call and provide data to the runtime helper routine to permit the unresolved reference to be resolved;

storing a copy of the emitted unresolved code in the snippet; and replacing the unresolved emitted code in the compiled code with a call instruction for calling the snippet, the runtime helper routine being defined to resolve references at runtime with respect to the copy of the emitted unresolved code in the snippet to define a resolved instruction and to replace the call instruction for calling the snippet with the resolved instruction.

9. The method of claim 8, further comprising:

generating a snippet list comprising entries corresponding to each snippet emitted; and traversing the snippet list to carry out the step of replacing the unresolved code in the compiled code with the call instruction to an appropriate snippet.

10. A computer program product comprising a computer usable medium tangibly embodying computer readable program code means for carrying out the method of claim 8.

11. A method for emitting compiled computer code to resolve references in a set of target instructions, each target instruction to be executed at a target location in the compiled code, each target instruction including an unresolved reference at compile time, the method comprising:

emitting a trigger instruction for each target instruction, the trigger instruction being located at the target location in the compiled code; and emitting a snippet for each target instruction comprising a copy of the target instruction including the unresolved reference and resolution data useable by a runtime helper, each trigger instruction being defined to trigger the execution of defined instructions to pass a specified set of resolution data to the runtime helper for resolution of the unresolved reference in a specified copy of a target instruction and to replace the trigger instruction at the target location with the specified copy of the target instruction having the unresolved reference resolved.

12. The method of claim 11 further comprising:

first emitting, for each one of the set of target instructions, the associated unresolved target instruction at the corresponding target location;

creating and maintaining a snippet list comprising entries, each entry in the snippet list corresponding to one of the set of target instructions;

subsequently traversing the snippet list, and for each entry in the snippet list defining the snippet in the compiled code relating to the one of the set of target instructions corresponding to the snippet list entry; and storing the associated unresolved target instruction in the defined snippet to permit the replacement of the associated unresolved target instruction at the target location for the associated unresolved target instruction with a corresponding trigger instruction.

13. The method of claim 11 in which the trigger instruction for a one of the set of target instructions is a call to the corresponding snippet for the target instruction and in which the corresponding snippet comprises instructions to pass data to the runtime helper.

14. The method of claim 11 in which the trigger instruction for a one of the set of target instructions comprises an illegal instruction for throwing an exception on execution to cause a branch to the corresponding snippet corresponding to the target instruction.

15. The method of claim 14 further comprising the step of carrying out a look up in a data structure to define the branch to the corresponding snippet corresponding to the target instruction, upon the exception being thrown.

* * * * *